United States Patent
Metzger

(10) Patent No.: US 11,685,279 B2
(45) Date of Patent: Jun. 27, 2023

(54) METHOD FOR MONITORING A LIQUID-COOLED CHARGING CABLE OF A CHARGING STATION FOR A TRACTION BATTERY OF AN ELECTRICALLY OPERATED MOTOR VEHICLE

(71) Applicant: Dr. Ing. h.c. F. Porsche Aktiengesellschaft, Stuttgart (DE)

(72) Inventor: Christian Metzger, Tamm (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 274 days.

(21) Appl. No.: 17/115,932

(22) Filed: Dec. 9, 2020

(65) Prior Publication Data

US 2021/0188110 A1 Jun. 24, 2021

(30) Foreign Application Priority Data

Dec. 18, 2019 (DE) ...................... 10 2019 134 857.9

(51) Int. Cl.
| | |
|---|---|
| *H02J 7/00* | (2006.01) |
| *B60L 53/60* | (2019.01) |
| *B60L 53/18* | (2019.01) |
| *B60L 53/302* | (2019.01) |
| *B60L 50/60* | (2019.01) |
| *G01B 7/16* | (2006.01) |
| *G01B 11/16* | (2006.01) |

(52) U.S. Cl.
CPC ............... *B60L 53/60* (2019.02); *B60L 50/60* (2019.02); *B60L 53/18* (2019.02); *B60L 53/302* (2019.02); *H02J 7/0031* (2013.01); *H02J 7/0047* (2013.01); *G01B 7/16* (2013.01); *G01B 11/16* (2013.01)

(58) Field of Classification Search
CPC ........ B60L 53/60; B60L 53/18; B60L 53/302; B60L 50/60; H02J 7/0047; H02J 7/0031; H02J 7/00; G01B 7/16; G01B 11/16
USPC ......................................................... 320/137
See application file for complete search history.

(56) References Cited

U.S. PATENT DOCUMENTS

| | | | | |
|---|---|---|---|---|
| 4,618,764 | A * | 10/1986 | Harmer ................ | G01M 11/085 73/705 |
| 10,029,575 | B2 | 7/2018 | Remisch | |
| 2015/0217654 | A1* | 8/2015 | Woo ........................ | B60L 53/16 320/109 |
| 2017/0024499 | A1* | 1/2017 | Takanashi ............. | G06F 30/394 |
| 2017/0338006 | A1* | 11/2017 | Gontarz ................... | B60L 3/00 |
| 2018/0055706 | A1* | 3/2018 | Madadin .................. | G06T 7/62 |
| 2018/0186315 | A1* | 7/2018 | Terzis ..................... | B60L 53/31 |
| 2018/0358150 | A1* | 12/2018 | Koenig ................... | B60L 53/18 |

FOREIGN PATENT DOCUMENTS

| | | | |
|---|---|---|---|
| CN | 1753045 A | * | 3/2006 |
| CN | 204115940 U | * | 1/2015 |
| DE | 102015120048 A1 | | 5/2017 |

(Continued)

*Primary Examiner* — Yalkew Fantu
(74) *Attorney, Agent, or Firm* — RatnerPrestia

(57) ABSTRACT

A method for monitoring a liquid-cooled charging cable of a charging station for a traction battery of an electrically operated motor vehicle. Undershooting of a minimum permissible bending radius of the charging cable is detected, and the undershooting of the minimum permissible bending radius is indicated to a user or charge point operator or service employee.

18 Claims, 1 Drawing Sheet

(56) References Cited

FOREIGN PATENT DOCUMENTS

| | | |
|---|---|---|
| DE | 202015009531 U1 | 2/2018 |
| DE | 102018204171 A1 | 9/2019 |
| WO | WO-2019162385 A1 * | 8/2019 .............. B60L 53/14 |

* cited by examiner

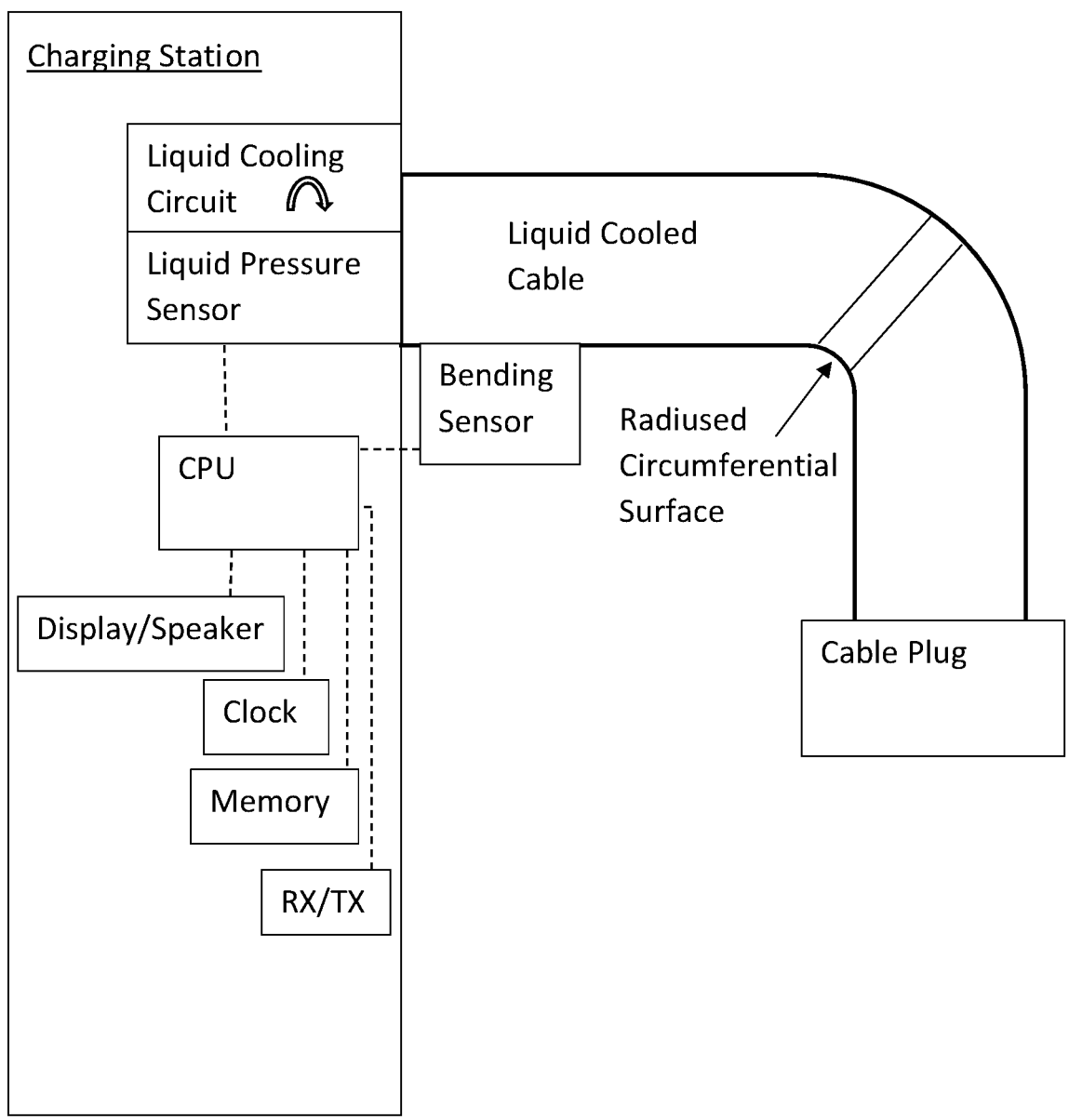

METHOD FOR MONITORING A LIQUID-COOLED CHARGING CABLE OF A CHARGING STATION FOR A TRACTION BATTERY OF AN ELECTRICALLY OPERATED MOTOR VEHICLE

CROSS-REFERENCE TO RELATED APPLICATION

This application claims priority to German Patent Application No. 10 2019 134 857.9, filed Dec. 18, 2019, the content of such application being incorporated by reference herein in its entirety.

FIELD OF THE INVENTION

The invention relates to a method for monitoring a liquid-cooled charging cable of a charging station for a traction battery of an electrically operated motor vehicle, to a liquid-cooled charging cable of this kind and to a charging station for a traction battery of an electrically operated motor vehicle comprising a charging cable of this kind.

BACKGROUND OF THE INVENTION

Charging cables by means of which an electrical connection can be established between a charging station and the traction battery of the motor vehicle for the purpose of charging the traction battery are known from the prior art.

Charging cables can be either uncooled or can comprise a cooling system, in particular an active cooling system. Uncooled charging cables generally have a very high effective weight and low flexibility owing to normative requirements. An active cooling system can be designed as a liquid cooling system. In this way, the charging cable can be liquid-cooled. A liquid-cooled charging cable of this kind is known from document DE 20 2015 009 531 U1, for example, which is incorporated by reference herein.

Liquid-cooled charging cables of this kind generally have a coolant circuit, which may extend over the entire length of the charging cable. However, if a minimum permissible bending radius of the charging cable is undershot, a coolant circuit of this kind may be damaged, possibly leading to leakage of the cooling medium as a result. Moreover, undershooting of the permissible minimum bending radius, particularly in the region of a plug connector of the charging cable, can also lead to impairment of the contact protection of a plug connector of the charging cable.

SUMMARY OF THE INVENTION

Described herein is a method for monitoring a liquid-cooled charging cable which reduces the risk of an escape of cooling liquid, in particular the risk of an inadvertent escape of cooling liquid and any associated risk of injury.

BRIEF DESCRIPTION OF THE DRAWING

The sole FIGURE depicts a block diagram schematic view of an exemplary charging station.

DETAILED DESCRIPTION OF THE INVENTION

Referring now to the sole FIGURE, broken lines indicate electrical signal connections. In the method according to aspects of the invention for monitoring a liquid-cooled charging cable of a charging station for a traction battery of an electrically operated motor vehicle, undershooting of a minimum permissible bending radius of the charging cable is detected, and the undershooting of the minimum permissible bending radius is indicated to a user or charge point operator or service employee and/or a measure is taken to protect the user.

The user or charge point operator or service employee preferably receives an indication that undershooting of the minimum permissible bending radius has occurred in previous charging cycles.

In a preferred embodiment, a bending radius of the charging cable is measured continuously and/or cyclically, and the measured bending radius is compared with the minimum permissible bending radius of the charging cable, wherein the undershooting of the minimum permissible bending radius is indicated to a user or charge point operator or service employee if the measured bending radius is smaller than the minimum permissible bending radius.

The undershooting of the minimum permissible bending radius is preferably detected by evaluating a cooling liquid pressure change in a cooling system of the liquid-cooled charging cable.

In a preferred embodiment, the undershooting of the minimum permissible bending radius is detected by evaluating at least one strain gage, at least one fiber-optic sensor, at least one piezoelectric element and/or at least one piezoceramic coating of the liquid-cooled charging cable.

A period of time during which the minimum permissible bending radius of the charging cable is undershot is preferably measured.

In a preferred embodiment, a charging process of the traction battery is interrupted if the undershooting of the minimum permissible bending radius is detected.

The undershooting of the minimum permissible bending radius is preferably indicated to a user on a circumferential surface of the charging cable, in particular by a color change at least of part of the circumferential surface.

The invention furthermore relates to a liquid-cooled charging cable for a charging station designed for charging a traction battery of an electrically operated motor vehicle, wherein the charging cable is designed for carrying out the method according to aspects of the invention for monitoring.

In a preferred embodiment, the liquid-cooled charging cable furthermore comprises a cooling system having a cooling circuit in which a cooling liquid circulates and in which a cooling liquid pressure prevails.

The liquid-cooled charging cable preferably furthermore comprises a bending sensor in the form of at least one strain gage, at least one fiber-optic sensor, at least one piezoelectric element and/or at least one piezoceramic coating for measuring a bending radius of the liquid-cooled charging cable. The bending sensor communicates its reading to a CPU, which is also connected to a display and a clock, for example. The CPU may also be configured to receive signals from a liquid pressure sensor that is fluidly connected to the fluid within the liquid cooled cable.

In a preferred embodiment, the liquid-cooled charging cable furthermore comprises a circumferential surface which is formed at least partially by an element of which the color can change in accordance with a pressure loading and/or tension loading, wherein the element is preferably formed by a sticker, a shrink-on sleeve and/or a sheath material.

Finally, the invention relates to a charging station for a traction battery of an electrically operated motor vehicle comprising a liquid-cooled charging cable according to aspects of the invention.

Details and further advantages of the method according to the invention, of the liquid-cooled charging cable according to aspects of the invention and of the charging station according to aspects of the invention are explained by means of an illustrative embodiment described below.

The application relates to a liquid-cooled charging cable, a charging station comprising a liquid-cooled charging cable of this kind, and a method for monitoring a liquid-cooled charging cable of this kind.

According to the method according to the application, undershooting of a minimum permissible bending radius of the charging cable is detected, and the undershooting of the minimum permissible bending radius is indicated to a user or charge point operator or service employee.

A bending radius of the charging cable can be measured continuously and/or cyclically, and using the processor/controller, the measured bending radius can be compared with the minimum permissible bending radius of the charging cable, wherein the undershooting of the minimum permissible bending radius can be indicated to a user if the measured bending radius is smaller than the minimum permissible bending radius.

The undershooting of the minimum permissible bending radius can be detected by evaluating (using the processor/controller) a cooling liquid pressure change in a cooling system of the liquid-cooled charging cable. In this case, the liquid-cooled charging cable can comprise a cooling system having a cooling circuit in which a cooling liquid circulates and in which a cooling liquid pressure prevails.

In particular, the cooling system can be a closed cooling system. In this case, a cooling liquid pressure change can be detected by a pressure sensor, which can be a component part of the liquid-cooled charging cable or of the charging station and can be arranged in the coolant circuit, for example.

The undershooting of the minimum permissible bending radius can be detected by evaluating at least one strain gage, at least one fiber-optic sensor, at least one piezoelectric element and/or at least one piezoceramic coating of the liquid-cooled charging cable. In this case, the liquid-cooled charging cable can comprise at least one strain gage, at least one fiber-optic sensor, at least one piezoelectric element and/or at least one piezoceramic coating for measuring a bending radius of the liquid-cooled charging cable.

The strain gage, the fiber-optic sensor, the piezoelectric element and/or the piezoceramic coating can be arranged on the charging cable. It is possible, for example, for a multiplicity of strain gages, fiber-optic sensors, piezoelectric elements and/or piezoceramic coatings to be arranged at uniform intervals along the charging cable.

The undershooting of the minimum permissible bending radius can be detected by measuring an existing bending radius of the liquid-cooled charging cable and comparing it with a minimum permissible bending radius. If the measured existing bending radius of the liquid-cooled charging cable is smaller than the minimum permissible bending radius, undershooting of the minimum permissible bending radius is detected.

The measurement of the existing bending radius can be accomplished by means of the strain gage, the fiber-optic sensor, the piezoelectric element and/or the piezoceramic coating.

A period of time during which the minimum permissible bending radius of the charging cable is undershot can furthermore be measured using a clock, for example. Accordingly, prolonged undershooting of the bending radius can be detected if the period of time exceeds a predetermined period of time.

Such prolonged undershooting of the bending radius can be stored in a fault memory of the charging station and/or indicated to an operator of the charging station by remote data transmission, for example, and by way of a receiver/transmitter (RX/TX, for example) that communicates to the operator via WiFi or cellular (for example). If there is such prolonged undershooting of the bending radius, a charging process of the traction battery can be interrupted, and/or the charging station can be put out of operation for a prolonged period until the functioning of the charging cable has been checked by a fitter and/or can be put out of operation until the charging cable is exchanged. After the exchange of the charging cable, the charging station can be put back into operation. The prolonged undershooting of the minimum permissible bending radius can be stored persistently in the fault memory of the charging station until the charging cable has been exchanged.

Various warning thresholds can be indicated to the user, e.g. a first warning threshold if the minimum permissible bending radius is briefly undershot, and a second warning threshold if the minimum permissible bending radius is undershot for a prolonged period during the period of time.

A charging process of the traction battery can be interrupted if the undershooting of the minimum permissible bending radius is detected.

The undershooting of the minimum permissible bending radius can be indicated to a user on a circumferential surface of the charging cable, in particular by a color change at least of part of the circumferential surface. In this case, the liquid-cooled charging cable can comprise a circumferential surface which is formed at least partially by an element of which the color can change in accordance with a pressure loading and/or tension loading, wherein the element of which the color can change is preferably formed by a sticker, a shrink-on sleeve and/or a sheath material. The use of a sticker or of a shrink-on sleeve can be advantageous, in particular, if already existing charging cables are to be retrofitted therewith.

The sheath material can comprise an additive which leads to a color change at the surface of the sheath material when undershooting of the minimum permissible bending radius is detected. In this case, the sheath material can be selected in such a way that it changes color when a certain pressure loading and/or tension loading is exceeded due to the undershooting of the minimum permissible bending radius.

In a preferred embodiment, undershooting of the minimum permissible bending radius can be indicated to the user or charge point operator or service employee by a change in the color of the color-modified element to red.

The liquid-cooled charging cable according to the application is intended for a charging station designed for charging a traction battery of an electrically operated motor vehicle. The charging cable is designed for carrying out the method according to the application for monitoring.

The charging station according to the application for a traction battery of an electrically operated motor vehicle comprises a liquid-cooled charging cable according to the application.

The charging station can comprise an interruption device for interrupting a charging process of the traction battery of the motor vehicle. The interruption device can bring about an interruption in the charging process if undershooting of the minimum permissible bending radius and/or prolonged undershooting of the permissible minimum bending radius of the charging cable are/is detected.

The charging station can comprise an indicating device for indicating the undershooting of the minimum permissible bending radius and/or for indicating the prolonged undershooting of the minimum permissible bending radius to a user. The indicating device can comprise a display, for example, in particular a liquid crystal display and/or one or more LEDs. As an alternative or in addition, it is also possible for the indicating device to comprise a loudspeaker, which acoustically indicates undershooting of the minimum permissible bending radius and/or prolonged undershooting of the minimum permissible bending radius to a user, e.g. by outputting an acoustic message or an acoustic signal.

The at least one strain gage, the at least one fiber-optic sensor, the at least one piezoelectric element and/or the pressure sensor can be designed for data communication with a central processing unit (CPU), in particular a central processing unit of the charging station. The existing measured bending radius can thus be transmitted to the central processing unit. The central processing unit can compare the measured existing bending radius with the minimum permissible bending radius.

The central processing unit can likewise be designed for data communication with the indicating device (e.g., the display) to enable the indicating device to receive control commands from the central processing unit to indicate the undershooting of the minimum permissible bending radius and/or to indicate the prolonged undershooting of the minimum permissible bending radius.

The method for monitoring the liquid-cooled charging cable can take place during a charging process of the traction battery or in a standby mode of the charging station.

What is claimed:

1. A method for monitoring a liquid-cooled charging cable of a charging station for a traction battery of an electrically operated motor vehicle, said method comprising:
    detecting an undershooting of a minimum permissible bending radius of a liquid-cooled charging cable, and
    indicating the undershooting of the minimum permissible bending radius to a user or charge point operator or service employee.

2. The method as claimed in claim 1, wherein a bending radius of the charging cable is measured continuously and/or cyclically, and the measured bending radius is compared with the minimum permissible bending radius of the charging cable, wherein the undershooting of the minimum permissible bending radius is indicated to the user or charge point operator or service employee if the measured bending radius is smaller than the minimum permissible bending radius.

3. The method as claimed in claim 1, further comprising detecting the undershooting of the minimum permissible bending radius by evaluating a cooling liquid pressure change in a cooling system of the liquid-cooled charging cable.

4. The method as claimed in claim 1, wherein detecting the undershooting of the minimum permissible bending radius is accomplished by evaluating at least one strain gauge, at least one fiber-optic sensor, at least one piezoelectric element and/or at least one piezoceramic coating of the liquid-cooled charging cable.

5. The method as claimed in claim 4, wherein the at least one strain gauge, at least one fiber-optic sensor, at least one piezoelectric element and/or at least one piezoceramic coating is/are attached to an exterior surface of the cable.

6. The method as claimed in claim 4, wherein the at least one strain gauge, at least one fiber-optic sensor, at least one piezoelectric element and/or at least one piezoceramic coating is/are not positioned within the cable.

7. The method as claimed in claim 1, further comprising measuring a period of time during which the minimum permissible bending radius of the charging cable is undershot.

8. The method as claimed in claim 1, wherein a charging process of the traction battery is interrupted if the undershooting of the minimum permissible bending radius is detected.

9. The method as claimed in claim 1, wherein further comprising indicating the undershooting of the minimum permissible bending radius to the user on a circumferential surface of the charging cable by a color change at least of part of the circumferential surface.

10. The method as claimed in claim 1, wherein an exterior of the cable is bendable.

11. A liquid-cooled charging cable system for a charging station for charging a traction battery of an electrically operated motor vehicle, wherein the liquid-cooled charging cable system includes a liquid-cooled charging cable and the system is configured to (i) detect an undershooting of a minimum permissible bending radius of the charging cable, and (ii) indicate the undershooting of the minimum permissible bending radius to a user or charge point operator or service employee.

12. The liquid-cooled charging cable system as claimed in claim 11, further comprising a cooling system having a cooling circuit in which a cooling liquid circulates and in which a cooling liquid pressure prevails.

13. The liquid-cooled charging cable system as claimed in claim 11, further comprising at least one strain gage, at least one fiber-optic sensor, at least one piezoelectric element and/or at least one piezoceramic coating that is configured for measuring a bending radius of the liquid-cooled charging cable.

14. The liquid-cooled charging cable system as claimed in claim 13, wherein the at least one strain gauge, at least one fiber-optic sensor, at least one piezoelectric element and/or at least one piezoceramic coating is/are attached to an exterior surface of the cable.

15. The liquid-cooled charging cable system as claimed in claim 13, wherein the at least one strain gauge, at least one fiber-optic sensor, at least one piezoelectric element and/or at least one piezoceramic coating is/are not positioned within the cable.

16. The liquid-cooled charging cable system as claimed in claim 11, wherein a circumferential surface which is formed at least partially by an element of which the color can change in accordance with a pressure loading and/or tension loading, wherein the element is a sticker, a shrink-on sleeve and/or a sheath material.

17. A charging station for a traction battery of an electrically operated motor vehicle, said charging station comprising (i) a housing, (ii) the liquid-cooled charging cable system as claimed in claim 11 connected to the housing, and (iii) a central processing unit stored within the housing.

18. The liquid-cooled charging cable system as claimed in claim 11, wherein an exterior of the cable is bendable.

* * * * *